United States Patent [19]
Waner

[11] Patent Number: 5,613,710
[45] Date of Patent: Mar. 25, 1997

[54] DUAL REAR WHEEL FENDER LINER

[76] Inventor: Alan R. Waner, R.R. 2, Box 175, Altamont, Ill. 62411

[21] Appl. No.: 489,225

[22] Filed: Jun. 12, 1995

[51] Int. Cl.⁶ ........................................... B62B 9/16
[52] U.S. Cl. .............................. 280/848; 280/851
[58] Field of Search .......................... 280/154, 770, 280/848, 849, 850, 851, 854

[56] References Cited

U.S. PATENT DOCUMENTS

| | | | |
|---|---|---|---|
| D. 284,575 | 7/1986 | Latas | D12/184 |
| 1,440,516 | 1/1923 | Whitton | 280/848 |
| 3,341,222 | 9/1967 | Roberts | 280/851 |
| 4,378,120 | 3/1983 | Laine | 280/848 |
| 4,447,067 | 5/1984 | Yamashita | 280/848 |
| 4,687,217 | 8/1987 | Stewart | 280/848 |
| 4,921,276 | 5/1990 | Morin | 280/848 |
| 5,108,129 | 4/1992 | Olsen | 280/850 |

FOREIGN PATENT DOCUMENTS

| | | | |
|---|---|---|---|
| 999897 | 11/1976 | Canada | 280/851 |
| 1008596 | 5/1957 | Germany | 280/854 |
| 3539146 | 5/1987 | Germany | 280/851 |
| 0218477 | 12/1983 | Japan | 280/850 |

*Primary Examiner*—Brian L. Johnson
*Attorney, Agent, or Firm*—Grace J. Fishel

[57] ABSTRACT

A fender liner for a dual wheel fender formed of epoxy-fiberglass and having a substantially flat top and an inboard side for attaching to a vehicle with bolts along the top of the fender on the inboard side. The fender liner is formed as an elongated flat panel made of sheet material with an inboard side flange. The flat panel runs substantially the length and breadth of the flat top on the inside of the fender for guarding the underside of the flat top against damage by rocks and other objects which may be hurled up against it. The fender liner is attached to the fender along the inboard side flange by the bolts attaching the fender to the vehicle along the top of the fender.

10 Claims, 2 Drawing Sheets

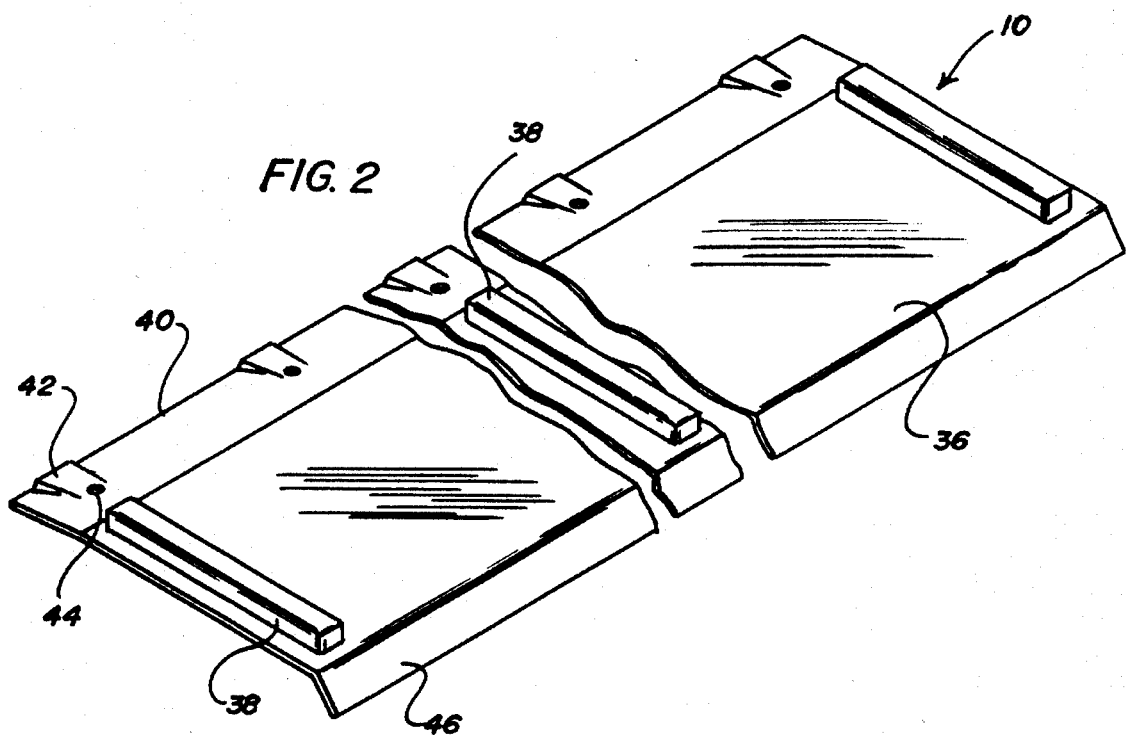
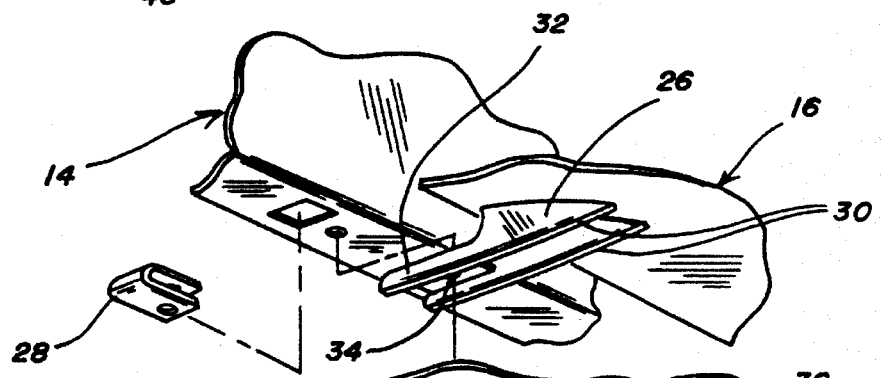
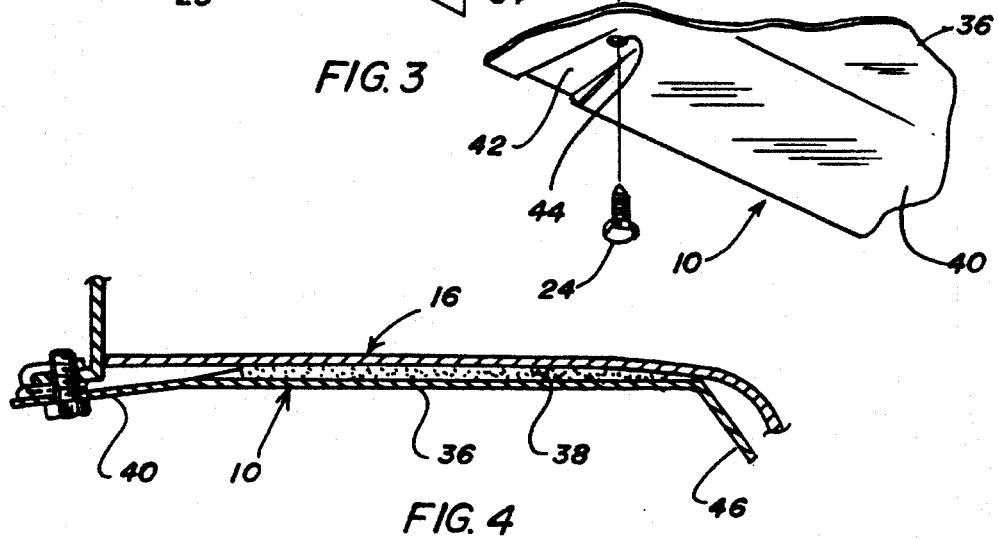

DUAL REAR WHEEL FENDER LINER

BACKGROUND OF THE INVENTION

1. Field of the Invention

The present invention relates to a fender liner for the top of a dual rear wheel fender.

2. Brief Description of the Prior Art

Pickups, vans and suburbans are sometimes outfitted with dual rear wheels (i.e., dualies) for the purpose of increasing traction off road, increasing payload and reducing sway. Dualies, even when factory installed, are attachments or add-ons rather than being integrated into the design of the rest of the vehicle's body. Dualie fenders are usually fabricated of epoxy-fiberglass. The standard fenders are removed, the wheel wells enlarged and the dualie fenders attached and painted to match.

Dual rear wheels extend out past the sides of the truck body and pick up dirt, gravel and rocks, some of which is flung outwardly and rearwardly, but a large part of it, if not most of it, is flung upward against the flat underside of the dualie fender above the wheels. The material striking the top of the fender then drops back down, some of which strikes the upper portion of the rotating wheel and is flung another time against the top of the dualie fender. The impact of the flung material is often sufficient to cause a cracking or "star" pattern to appear in the painted surface on the top of the fender, marring the appearance of the fender, and being cause for a new, and expensive, paint job to be applied.

The fender liners of the present invention are described with respect to a Ford truck. Ford offers front and rear vertical splash shields for attachment from the top of the fender just in front of and behind the rear wheels. While minimizing road splash, the shields offer no protection from star cracking along the top of the fender. Fender liners for the entire fender have also been proposed but they have not been a marketing success because of cost, installation difficulties and other considerations. It has not been recognized that it is the top, not the front and rear of the fender in need of protection, and that a shield over the entire inside of the fender is unnecessary.

SUMMARY OF THE INVENTION

In view of the above, it is an object of the present invention to provide a fender liner for a dual wheel fender formed of epoxy-fiberglass, that is strategically located in the fender as a guard against star cracking. It is also an object to provide a cost effective and easy to attach fender liner for a dual wheel fender. Other objects and features of the invention will be in part apparent and in part pointed out hereinafter.

In accordance with the invention, a fender liner is provided for a dual wheel fender of the kind formed of epoxy-fiberglass and having a substantially flat top, an inboard and an outboard side and making attachment to a vehicle with bolts along the top of the fender on the inboard side. The fender liner guards the underside of the flat top of the fender against damage by rocks and other objects which may be hurled up against it. The fender liner has an elongated flat panel formed of sheet material with an inboard side flange. The flat panel runs substantially the length and breadth of the flat top and is suited to be installed inside the fender along the flat top. The fender liner is attached to the fender along the inboard side flange of the fender liner by the bolts attaching the fender to the vehicle along the top of the fender.

The invention summarized above comprises the constructions hereinafter described, the scope of the invention being indicated by the subjoined claims.

BRIEF DESCRIPTION OF THE DRAWINGS

In the accompanying drawings, in which one of various possible embodiments of the invention is illustrated, corresponding reference characters refer to corresponding parts throughout the several views of the drawings in which:

FIG. 2 is a perspective view of the fender liner;

FIG. 3 is an exploded perspective view of an angled bracket to which the fender liner is attached by bolts attaching the fender to the quarter panel; and, FIG. 4 is a sectional view taken along line 4—4 in FIG. 1.

DETAILED DESCRIPTION OF THE INVENTION

Figure 1:
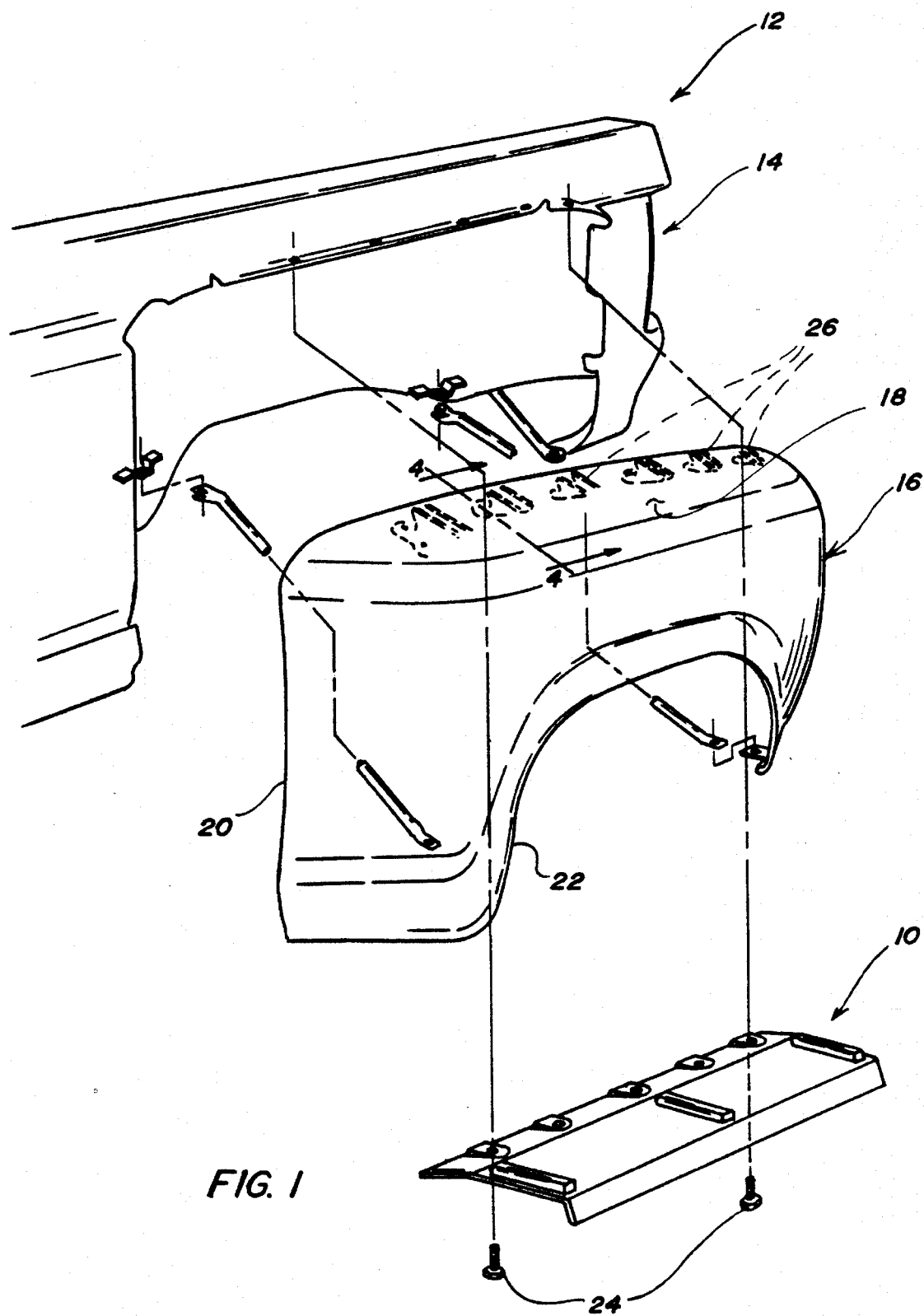
FIG. 1 is an exploded perspective view of a fender liner in accordance with the present invention for assembly with a dualie fender attached to a rear quarter panel of a truck.

Referring to the drawings more particularly by reference character, reference numeral 10 refers to a fender liner in accordance with the present invention for use on a pickup truck, van, suburban or the like with dual rear wheels (i.e., dualies). In the form illustrated in FIG. 1, a pickup truck 12 includes a body with a rear quarter panel 14 having enlarged wheel wells and axles that extend out past the sides of the truck body. A pair of wheels are mounted on each axle and are enclosed in a fender 16 attached to rear quarter panel 14 as more particularly described below.

Fender 16 is formed of epoxy-fiberglass and has a substantially flat top 18, an inboard side 20 and an outboard side 22. Fender 16 is attached to quarter panel 14 with bolts 24 along the top of the fender on inboard side 20. In the case of a Ford truck, as best seen in FIG. 1, flat top 18 of fender 16 is mounted on angled brackets 26 making attachment to quarter panel 14 with bolts 24. Turning to FIG. 3, bolts 24 mate with attachment clips 28 mounted in the frame of quarter panel 14. Angled brackets 26 include a pair of ribs 30 joined by a projecting lip 32 with a hole 34 through which one of bolts 24 passes.

Fender liner 10 includes an elongated flat panel 36 formed of a relatively stiff sheet of material such as sheet metal, polyurethane, etc. Flat panel 36 is sufficiently thick to protect the inside of flat top 18 of fender 16 from being damaged by rocks or other objects thrown up into engagement with the top underside of the fender as truck 12 is driven. Such objects, intercepted by fender liner 10, do not damage flat top 18 of fender 16. Thus, starring or cracking of the paint job on the upper surface of the fender and other types of damage which such objects can cause are avoided.

In preferred form, fender liner 10 is formed of sheet metal, most preferably galvanized sheet metal such as 28-gage galvanized steel. Panel 36 runs substantially the length and breadth of flat top 18 and is suited to be installed inside fender 16 flush with flat top 18 or spaced therefrom with elastomeric bumpers 38 which are attached to flat panel 36 on the side of the panel opposing the top of the fender.

Panel 36 has an inboard side flange 40 running the length of panel 36. As shown in FIG. 2, inboard side flange 40 may be integral with flat panel 36 and stiffened by bending it back upon itself. Inboard side flange 40 is preferably at about a 5 degree angle to the plane within which flat panel 36 lies. A row of dimples 42 may be formed in inboard side flange 40 for receipt between spaced apart tapered ribs 30. Each of dimples 42 includes a hole 44 through which one of bolts passes for attachment of fender liner 10 to brackets 26. Dimples 42 secure the fender liner against longitudinal movement when the truck stops and starts. With continuing reference to FIG. 2, panel 36 also has an outboard side flange 46, running the length of the panel and angled downwardly a short distance along outboard side 22 of fender 16, most preferably at an angle of about 35 degrees to the plane of the flat panel.

Fender liner 10 is mounted or installed on the underside of fender 16 using the normal fastener bolts 24 used to attach fender 16 along inboard side of fender 16 at flat top 18. For example, with fender 16 in place on truck 12, the bolts 24 along flat top 18 of fender 16 are first removed. Fender liner 10 is inserted into fender 16 and flat panel 36 pressed against the underside of flat top 18 with holes 44 in inboard side flange 40 aligned with holes 34 in lip 32. Bolts 24 are then pushed back through the aligned holes and pushed up into angled engagement with clips 28 and tightened. Fender liner 10 is thus securely held in place on the underside of flat top 18 of fender 16. When truck 12 is a Ford F350, for example, fender liner 10 may be flanked by vertical splash guards (e.g., part No. 28370, not shown).

While the fender liner of the present invention has been shown and described relative to a Ford F350 truck, it will be appreciated that, with suitable modification, it can be used with other vehicles having dualies. Hence, the principles of this invention will apply to similarly designed fenders even when the fender liner has to be differently shaped to fit.

In use, fender liner 10 is strategically located on the underside of flat top 18 and prevents star cracking. Further extension of fender liner down the front and rear of the fender is not necessary and may be harmful. For example, as mentioned above, vertical splash guards (part No. 28370) may be suspended from flat top 18 just in front and behind the dual wheels. In addition to controlling the mist and spray flung rearward and outward, the vertical splash guards also protect the front and rear fender skirt from stone damage but star cracking seldom occurs in these locations anyway. On the other hand, in deep mud, the splash guards may cause the wheels to mire down because the vertical splash guards do not allow the tires to fling off the mud. Other liners have similar failings.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A fender liner for a dual wheel fender, said fender formed of epoxy-fiberglass and having a substantially flat top, an inboard and an outboard side, said fender mounted on angled brackets along the top of the fender on the inboard side of the fender to a rear quarter panel of a vehicle with bolts through the angled brackets, said fender liner comprising an elongated flat panel formed of sheet material with an inboard side flange, said flat panel running substantially the length and breadth of the flat top and suited to be installed inside the fender along the flat top, said fender liner adapted to be attached to the angled brackets along the inboard side flange of the fender liner by the bolts attaching the fender to the vehicle along the top of the fender whereby the underside of the flat top of the fender is guarded against damage by rocks and other objects which may be hurled up against the flat top of the fender.

2. The fender liner of claim 1 wherein the sheet material is galvanized sheet metal.

3. The fender liner of claim 2 wherein the elongated flat panel has an outboard side flange angled downwardly a short distance and suited to be installed inside the fender along the outboard side of the fender.

4. A fender liner for a dual wheel fender, said fender formed of epoxy-fiberglass and having a substantially flat top, an inboard and an outboard side, said fender mounted on angled brackets along the top of the fender on the inboard side of the fender to a rear quarter panel of a vehicle with bolts through the angled brackets, said fender liner comprising an elongated flat panel formed of sheet material with an inboard side flange and an outboard side flange running the length of the panel, said flat panel running substantially the length and breadth of the flat top and suited to be installed inside the fender along the flat top, said fender liner adapted to be attached to the angled brackets along the inboard side flange of the fender liner by the bolts attaching the fender to the vehicle along the top of the fender, said outboard side flange angled downwardly a short distance and suited to be installed inside the fender along the outboard side of the fender whereby the underside of the flat top of the fender is guarded against damage by rocks and other objects which may be hurled up against the flat top of the fender.

5. The fender liner of claim 4 wherein the sheet material is sheet metal and a plurality of elastomeric bumpers are attached to the flat panel of the fender liner on the side of the flat panel opposing the top of the fender when the fender liner is attached to the fender.

6. The fender liner of claim 5 for a fender wherein each angled bracket includes a pair of spaced apart tapered ribs joined by a projecting lip, said top of the fender overlying and attached to the ribs and one of said bolts attaching the bracket to the quarter panel passing through a hole in the lip, said fender liner having a plurality of dimples in the inboard side flange for receipt between the spaced apart tapered ribs thereby securing the fender liner against longitudinal movement.

7. The fender liner of claim 6 wherein the flat panel is in a plane and the inboard side flange makes about a 5 degree angle with said plane.

8. The fender liner of claim 7 wherein the outboard side flange makes about a 35 degree angle with said plane.

9. The fender liner of claim 8 wherein the sheet metal is bent back upon itself along the inboard side flange.

10. The fender liner of claim 9 wherein the sheet metal is 28-gage galvanized steel.

\* \* \* \* \*